E. T. CONDON, Jr.
AUTOMATIC BRAKE MECHANISM.
APPLICATION FILED OCT. 8, 1912.

1,267,378.

Patented May 28, 1918.
2 SHEETS—SHEET 1.

Attest:

Inventor: Edward T. Condon Jr.
by Wm. B. Whitney
Atty

E. T. CONDON, Jr.
AUTOMATIC BRAKE MECHANISM.
APPLICATION FILED OCT. 8, 1912.

1,267,378.

Patented May 28, 1918.
2 SHEETS—SHEET 2.

Attest:
C. B. Mitchell
May Frevert

Edward T. Condon Jr. Inventor:
by Wm B. Whitney
Atty

UNITED STATES PATENT OFFICE.

EDWARD T. CONDON, JR., OF NEW YORK, N. Y., ASSIGNOR TO CONDON-AUTOSTOP COMPANY, A CORPORATION OF NEW YORK.

AUTOMATIC BRAKE MECHANISM.

1,267,378.     Specification of Letters Patent.    Patented May 28, 1918.

Application filed October 8, 1912. Serial No. 724,500.

*To all whom it may concern:*

Be it known that I, EDWARD T. CONDON, Jr., a citizen of the United States, residing at New York, in the county of New York and State of New York, have invented certain new and useful Improvements in Automatic Brake Mechanism, of which the following is a specification.

My present invention relates to automatic brake mechanism for talking machines, particularly for that type of talking machine in which a disk record is employed, and to certain novel combinations of elements used therein which are well adapted for use in other and different connections.

The principal object of the invention is to provide a brake mechanism which, while inexpensive, readily attachable, and not liable to get out of order, may be used on talking machines without adjustment or regulation in connection with any standard disk record, notwithstanding the variations in the pitch of its sound-groove, and which will automatically stop the machine at the end of the selection no matter how long or how short that selection may be.

A further object of the invention is to provide a brake mechanism in which the brake may be released and reset, to start the machine, by a simple manipulation of the sound-arm.

A still further object is to provide an automatic brake mechanism which may be attached to any of the present standard talking machines without cutting away any part of or making any additional holes in the cabinet.

For the accomplishments of these objects the invention comprises certain novel features of construction, arrangement, and combination of parts, hereinafter fully described and more particularly pointed out in the claims.

Figure 1:
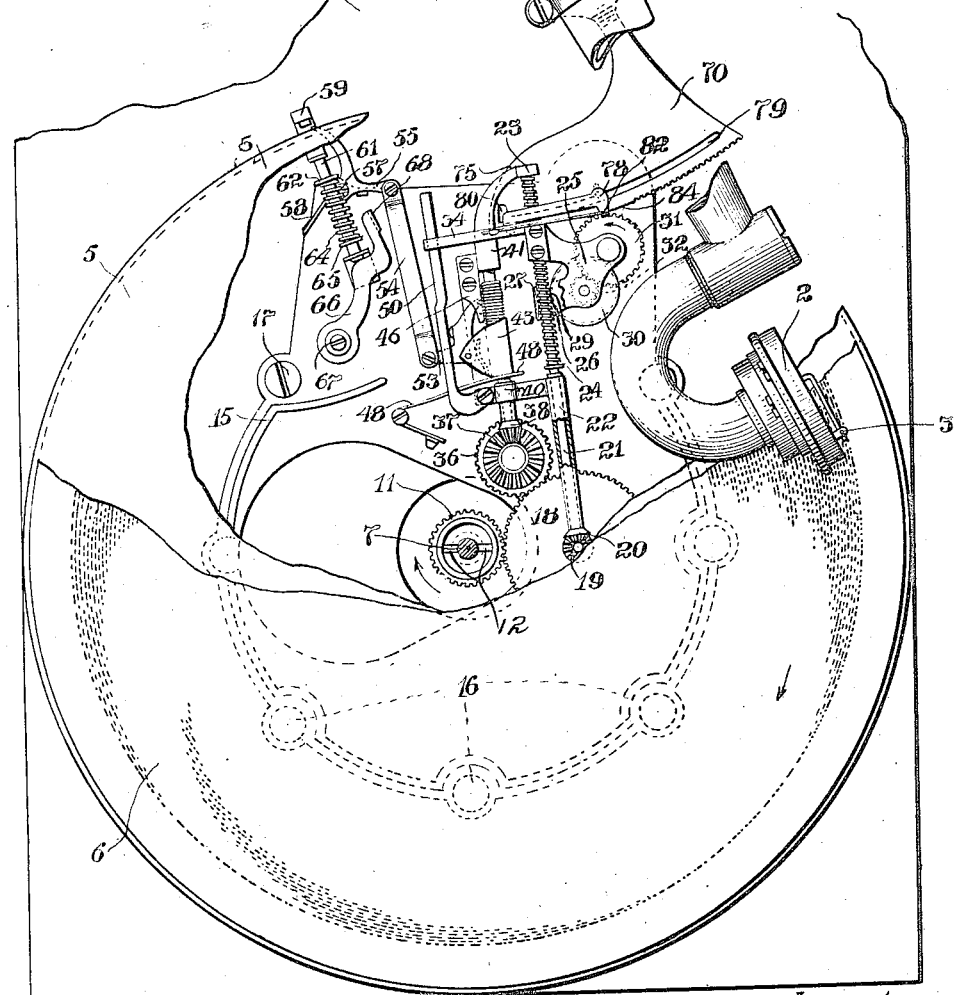
Figure 2:
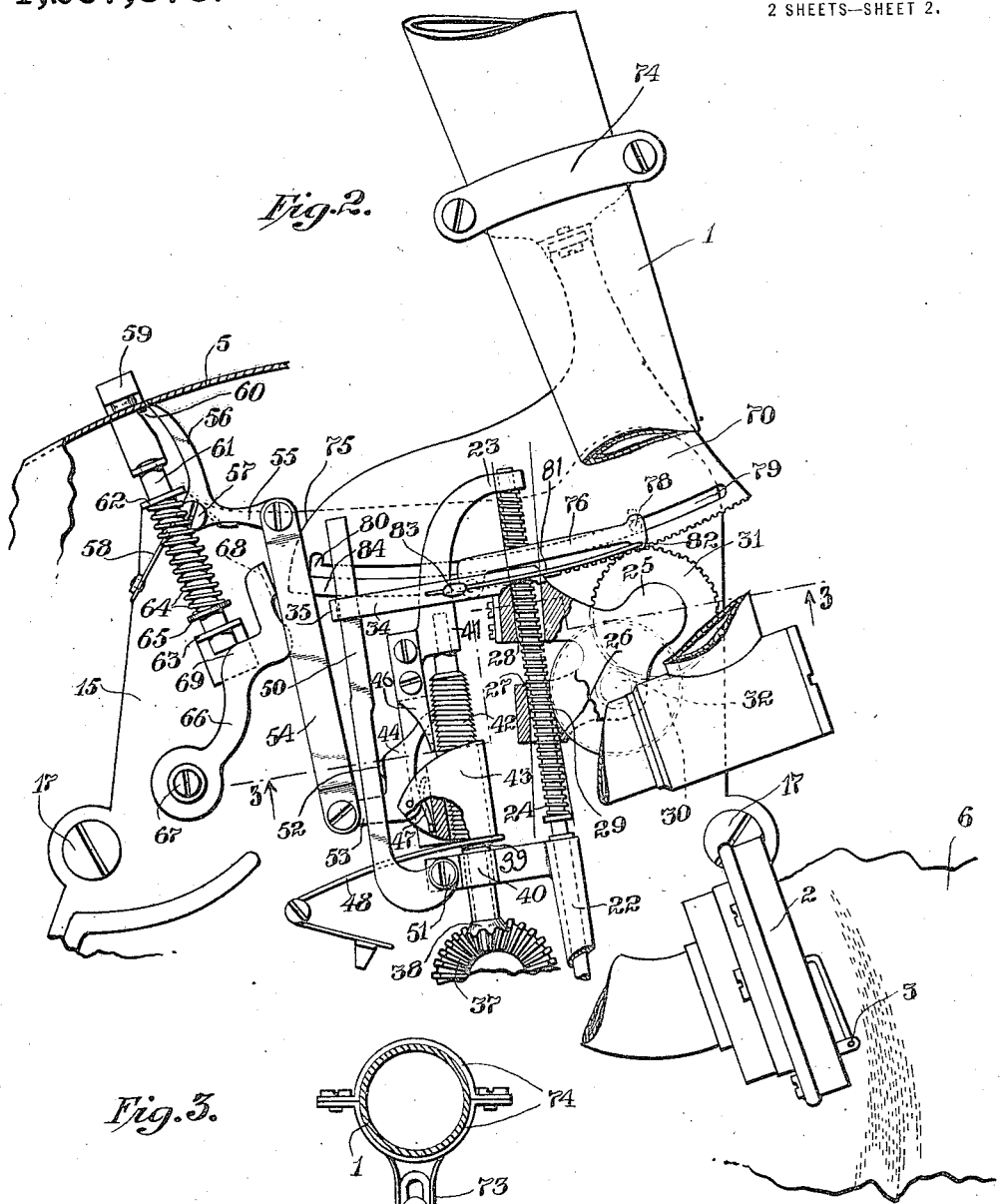
Figure 3:
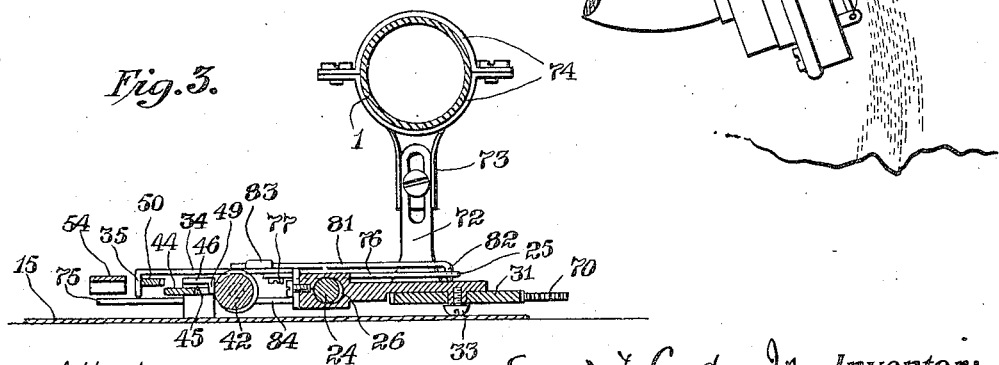

In the accompanying drawings, which form a part of this specification and wherein there is illustrated one specific embodiment of my invention as adapted for and attached to a standard talking machine, Figure 1 is a plan view, with parts broken away, of a talking machine showing my improved brake mechanism in its normal or inoperative position; Fig. 2, a plan view, on a larger scale and partly in section, of the same brake mechanism in operative position and of such broken parts of the machine as are necessary for the understanding of its operation; Fig. 3, a section on the irregular line 3 3 of Fig. 2; and Fig. 4, a detail showing, in elevation and partly in section, the means here employed for operatively connecting the brake mechanism with the vertical shaft or spindle of the motor.

The same reference numerals are used to indicate like parts throughout the several figures of the drawings.

Referring to the drawings, the usual sound-arm 1, carrying at its outer end the sound-box 2 and needle 3, is pivotally mounted on the top of the cabinet 4. The turn-table 5, carrying a record 6, is supported upon the projecting upper end of the motor-spindle 7 by the transverse pin 8, which is set in the spindle and normally bears against the bottom of a semi-circular notch 9 in the lower end of the collar 10 fixed to the lower side of the turn-table.

As here shown, the brake mechanism comprises a gear which is slipped upon the motor-spindle below the turn-table, a base-plate which is attached to the top of the cabinet and upon which is mounted the brake proper and most of the actuating mechanism therefor, and a sector-gear which is attached to and moves with the sound-arm.

Figure 4:
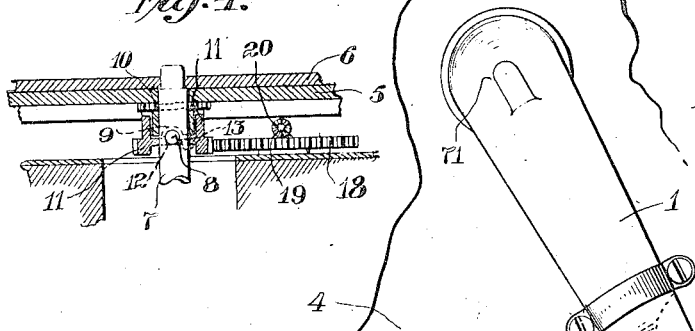

The gear 11, with central opening fitting the motor-spindle, is provided with slots 12 the inclined sides 13 of which grip the pin 8 only at their upper edges, thus providing support for the gear upon the pin while allowing nearly half of the pin to project upwardly through the slots (see Fig. 4). This gear is put in place by removing the turn-table and slipping the gear upon the spindle, the turn-table being then replaced.

The base-plate 15 is provided with a number of screw holes 16 positioned to register with the holes of the screws 17 by which the motor is secured to the cabinet in the different makes of standard machines, and may therefore be attached to any of these machines by simply removing two or more of these screws, positioning the plate upon the top of the cabinet, and then replacing the screws. Mounted upon this base-plate is a gear 18 which meshes with the gear 11 and carries a bevel pinion 19 which in turn meshes with a bevel pinion 20 fixed to the end of the shaft 21. The shaft is journaled in bearings 22—23 secured to the base-plate and between these bearings is provided with a worm 24. Slidably mounted upon this worm is a block 25 the bearings of which are slightly enlarged at 26 on one side and at 27 and 28 on the other side of the worm, thus allowing the block to swing horizontally upon the worm, around the point 29 as a center, from the position in which it is shown in Fig. 1 to that shown in Fig. 2. Pivotally mounted upon the lower side of the block are two gears 30 and 31, the gear 30 meshing with the worm at the point 29 and the gear 31 meshing with a pinion 32 fixed to the lower side of the gear 30, while the rounded end of the screw 33 (see Fig. 3) by which gear 31 is secured upon its pivotal bearing rests upon the base-plate and supports the block in horizontal position. The block also carries, rigidly secured to its outer end and extending at right angles to the axis of its bearing upon the worm, an arm 34 terminating in the downturned finger 35. A second gear 36 mounted upon the base-plate to mesh with the gear 18 carries a bevel pinion 37 meshing with a bevel pinion 38 fixed to the end of the shaft 39, the said shaft being supported in bearings 40 41 secured in the base-plate and provided with a ratchet-worm 42. A block 43 is mounted to slide upon this worm and carries pivotally mounted within its recessed edge a pawl 44, which is adapted to swing through a slot 45 under the fixed finger-piece 46 into engagement with the worm but is normally held out of such engagement by the spring 47. When in mesh with the worm the pawl, together with the block, is moved forward by the worm against the action of the spring 48 until disengaged by the wedge action of a shoulder 49 on the finger-piece 46 which forms the forward end of the slot 45, whereupon the parts are moved back to normal position by the spring 48. A lever-arm 50, which is pivoted to the base-plate at 51, bears against the finger 52 projecting upwardly from the back of the pawl and in turn is engaged by the downturned finger 35 of the arm 34. The arm 53 of the pawl is pivotally connected by the link 54 to the arm 55 of a trigger or detent 56, which is pivoted at 57 to the base-plate and is normally held in active position by the spring 58. The brake 59, which is adapted to bear against the downturned peripheral rim of the turn-table, is attached to the end of a bar 61 mounted to slide in brackets 62 63 secured to the base-plate and is normally held in its "on" position by the spring 64 which is coiled around the bar and bears at one end against the bracket 62 and at the other end against a collar 65 on the bar. It is held in "off" position, against the action of the coiled spring, by the engagement of the trigger with the notch 60 formed in its side. A lever 66, which is pivoted at 67 to the base-plate and which at its other end has a downwardly projecting finger 68, is provided intermediate its ends with the cam-surface 69 which is adapted to bear against the inner end of the brake-bar to force the brake outwardly to its "off" position.

The sector-gear 70, centered at 71 (Fig. 1) slightly to one side of the pivotal center of the sound-arm, is mounted upon to swing with the sound-arm by means of the upright arm 72 which is adjustably secured to the vertically depending arm 73 attached to the sound-arm by the strap 74; and its edge 75 is adapted to engage the downturned finger and actuate the pivoted cam-lever 66, when the sound-arm is swung inwardly toward the center of the record. It is connected with the sliding block 25, hereinabove described, by means of the lever-arm 76 which is pivoted at 77 (Fig. 3) to the projecting arm 34 of the block and is provided at its other end with a headed pin 78 which works in the curved slot 79 extending parallel to the periphery of the sector-gear, the end of the slot being enlarged at 80 to admit the head of the pin. The spring 81, which at the end 82 is pivoted in the outer end of the lever-arm 76 and at its other end is held in the lug 83 on the back of the arm 34 fixedly in line with that arm, tends normally to draw the arm 34 back until the pivoted lever-arm 76 extends parallel thereto and thus to hold the block 25 in the position shown in Fig. 1, with the gear 31 yieldingly pressed against the sector-gear with which it is adapted to mesh. A portion 84 of the periphery of the sector-gear is preferably not toothed, so that when the machine is started with the needle in the outer end of the sound-groove of the record the gear 31 will for a time bear against this plane portion of the sector-gear. The toothed portion is, however, extended inwardly so that its teeth will reach and mesh with the gear 31 before the needle reaches the end of even the shortest sound-groove.

The brake mechanism is so designed as to operate normally in connection with a record having a sound-groove of the highest standard pitch, for example, one hundred and twenty turns to the inch, and can then, because adapted to compensate for normal variations in the speed of the movement of the sound-arm due to variations in the pitch of the sound-groove, be used without adjustment or change of any kind in connection with records having sound-grooves of lower or partly lower pitch. Accordingly, the gears connecting the gear 31 with the motor-spindle are so proportioned that, when the needle is moved inwardly across the record for one inch by one hundred and twenty revolutions of the spindle and turn-table, the gear 31 actuated by the spindle through its train of gears and the sector-gear actuated by the inwardly swinging sound-arm will move together at substantially the same speed.

The operation of the device is as follows: The machine is started with a record of the highest pitch, say, a pitch of one hundred and twenty, upon the turn-table. The parts of the machine and the brake mechanism are then in the position illustrated in Fig. 1, with the gear 31 bearing against the plane surface of the sector-gear 70, and the gear and sector-gear, both actuated by the motor the former through its train of gears and the latter through the movement of the sound-arm as the needle is carried inwardly in the spiral sound-groove of the revolving record, begin to move, the gear 31 preferably with a speed slightly less than the speed of the sector-gear. After the record has made a number of revolutions the sound-arm will have been moved around until the toothed portion of the sector-gear reaches the gear 31 and the teeth of one will then either mesh with or bear against the ends of those of the other, but in neither event will the needle exert any undue pressure against the sides of the sound-groove as the sector-gear will move slightly faster than the gear 31. On reaching the end of the sound-groove the needle remains stationary, and the further movement of the sound-arm and consequently of the sector-gear is thereupon arrested. Then, as the worm continues to revolve while the sector-gear remains stationary, the gear 31 turning if not already in mesh until it can be brought by the spring 81 into mesh with the sector-gear and beginning to bind, will run backward along the sector-gear and at the same time lock or partially lock the gear 30 against rotation, with the result that the block 25 will both be driven outwardly upon the worm and swung around upon the point 29 as a pivot to the position shown in Fig. 2, thereby causing the finger of its projecting arm 34 to trip the pivoted lever-arm 50 and force the pawl 44 into engagement with the ratchet-worm 42. Thereupon, this latter worm revolving at relatively high speed will move forward the pawl and sliding block 43, almost instantly withdrawing the trigger 56 from the notch 60 and thus releasing and setting the brake, until the pawl strikes the shoulder 49 and is thereby thrown out of mesh with the worm, whereupon the parts will be restored to normal position by the springs 48 and 58. To release the brake and start the machine again, the needle is simply raised from the record and the sound-arm swung over until the edge 75 of the sector-gear, engaging the downturned finger of the pivoted arm 66, forces that lever back and the brake out until the trigger springs back into the notch therein. The fact that the sector-gear is mounted slightly off center, thus causing it to act as a cam with gradually decreasing radii as the sound-arm moves inwardly toward the center of the record, and producing a slight slipping motion, provides the necessary compensation in case a record of lower pitch is used upon the machine and obviates friction. In such case where a record, for example, has a pitch of seventy turns to the inch, which is practically the minimum, the sector-gear will of course move somewhat more rapidly than when a record of higher pitch is used and therefore more rapidly than the gear 31, and will slip thereon until its teeth can come into mesh with those of the gear 31 and thereafter its higher rate of speed will be substantially taken up by the gradually decreasing radii on which it acts.

While I have explained the principle of my invention in what I now consider the best mode in which to apply that principle, it will of course be understood that the specific embodiment of the invention shown and described can be greatly modified in its various details, within the scope of the appended claims, without departing from the spirit or sacrificing the advantages thereof.

What I claim as new, and desire to secure by Letters Patent, is—

1. In brake mechanism, the combination with two moving members of a brake member for one of said moving members and means adapted to remain inoperative during variations in the speed of the second of said movable members above a certain predetermined minimum and to be rendered operative by a reduction of its speed below such minimum to render said brake member operative to stop the first of said moving members.

2. In brake mechanism, the combination with two moving members adapted to travel one at substantially constant and the other at varying speeds of a brake member for said constant speed moving member and means adapted to compensate for normal variations in the movement of said varying speed movable member and rendered operative by the stopping thereof to render said brake member operative.

3. In brake mechanism, the combination with two movable members and a motor adapted to drive them, one at substantially constant and the other at varying speeds, of brake means for said constant speed movable member which are adapted to remain inoperative while permitting said varying speed movable member to move at varying speeds and are rendered operative by the stopping thereof.

4. In brake mechanism, the combination of a rotating member, a traveling member, a motor adapted to drive the rotating and traveling members, the traveling member at varying speeds, and brake means for the rotating member rendered operative by the stopping of the traveling member and adapted without regulation to the varying speeds thereof.

5. In brake mechanism, the combination of a rotating member, a traveling member adapted to move at varying speeds, a brake for the rotating member, a trip device for the brake, and means adapted without regulation to the varying speeds of the traveling member and rendered operative by the stopping thereof to actuate the trip device.

6. In brake mechanism, the combination of a rotating member, a traveling member adapted to move at varying speeds, a brake for said rotating member, a trip for said brake, and means adapted to compensate for normal variations in the speed of the traveling member and rendered operative by the stopping thereof to actuate the trip.

7. In brake mechanism, the combination with two moving members of a brake for one of said members and means located immediately beneath such member and rendered operative by the stopping of the other member to render the brake operative.

8. In brake mechanism, the combination with a rotating member and a traveling member of a brake for the rotating member tending normally to make frictional engagement therewith, means for holding the brake out of such engagement, and means located immediately below the rotating member and rendered operative by the stopping of the traveling member for releasing the brake to allow it to engage the rotating member.

9. In brake mechanism, the combination with a rotating member and a traveling member of brake means for the rotating member comprising a brake, an arm adapted to be attached to the traveling member, and connecting means located immediately below the rotating member and rendered operative by the stopping of the traveling member to render the brake operative.

10. In brake mechanism, the combination of a rotating member, a traveling member, a brake adapted normally to engage the rotating member, means for holding the brake out of such engagement, and means rendered operative by the stopping of the traveling member for releasing the brake to allow it to engage the rotating member.

11. In brake mechanism, the combination of a rotating member, a traveling member, a motor, a brake adapted to act upon the rotating member, means tending normally to move the brake into contact with the rotating member, means for holding the brake in inoperative position out of contact with the rotating member, and means actuated by the motor and rendered operative by the stopping of the traveling member to release said brake-holding means.

12. In brake mechanism, the combination of a rotating member, a traveling member, a motor adapted to drive said members, a brake for the rotating member, means for holding the brake in inoperative position, means actuated by the motor for releasing the brake from its inoperative position, means actuated by the motor and rendered operative by the stopping of the forward movement of the traveling member to bring into operation the brake-releasing means, and means actuated by a further forward movement of the traveling member to restore the brake to its inoperative position.

13. In brake mechanism, the combination of a rotating member, a traveling member, and brake means for the rotating member rendered operative by the stopping of the forward movement of the traveling member and rendered inoperative by a further forward movement of the traveling member.

14. In brake mechanism, the combination of a brake and brake-actuating means which include as elements thereof a worm, means for driving the worm, a block mounted to slide and also to swing laterally at one end upon the worm and operatively connected with the brake, a gear mounted upon the block to mesh with the worm at the point around which the block turns when swinging laterally thereon, a second gear mounted upon the block near its outer swinging end in mesh with the first gear, and an element adapted in coöperation with the second gear to cause the block to be moved outwardly and to swing laterally upon the worm.

15. A brake mechanism which includes as elements thereof a brake, a worm, means for driving the worm, a block mounted to slide upon the worm and provided with bearings allowing its outer end a limited lateral movement thereon, a trip-arm secured to the outer end of the block in operative relationship with the brake, a train of gears mounted upon the block to mesh with the worm at the axis of the lateral movement of the block, and a toothed element adapted to move in mesh with one of the gears of the train of gears and on the stopping of its movement to cause the block to be moved to actuate the trip.

16. A brake mechanism which includes as elements thereof a worm, means for driving the worm, a block mounted to slide upon the worm and provided with bearings allowing its outer end a limited lateral movement around its inner end as a center, a trip-arm secured to the outer end of the block on one side of the worm, two gears mounted in train upon the block on the opposite side of the worm one of which gears meshes with the worm at the inner end of the block and the other of which gears projects outwardly beyond the outer end of the block, a sector-gear mounted adjacent the outer end of the block and adapted to mesh with the outer of the two gears thereon, means independent of the worm for driving the sector-gear at substantially the same speed as that at which the outer gear is driven by the worm, and means tending normally to slide the block outwardly and swing its outer end laterally to throw the outer gear toward the worm and press it outwardly into engagement with the sector-gear.

17. A brake mechanism which includes as elements thereof a traveling member, a motor adapted to drive the traveling member, a worm driven from the motor, a block mounted to slide upon the worm and having bearings allowing its outer end a limited lateral movement around its inner end as a center, a trip-arm secured to the outer end of the block on one side of the worm, gears mounted in train upon the block on the other side of the worm the inner gear meshing with the worm at the inner end of the block and the outer gear extending outwardly beyond the outer end of the block, a sector-gear mounted upon the traveling member adjacent the outer end of the block and adapted to mesh with the outer gear thereon, and means tending normally to slide the block outwardly and move its outer end laterally to hold the outer gear close to the worm and to press it outwardly against the sector-gear.

18. A brake mechanism which includes as elements thereof a traveling member, a motor adapted to drive the traveling member, a worm driven from the motor, a block mounted to slide upon the worm and having bearings allowing its outer end a limited lateral movement around its inner end as a center, a trip-arm secured to the outer end of the block on one side of the worm, gears mounted in train upon the block on the other side of the worm the inner gear meshing with the worm at the inner end of the block and the outer gear extending outwardly beyond the outer end of the block, a sector-gear mounted upon the traveling member adjacent the outer end of the block and its outer gear and slightly eccentric so as to present a gradually retreating periphery as the traveling member moves forward, a lever pivoted at one end to the trip-arm on the block and bearing at its other end in a grooved slot in the sector-gear, and means tending normally to draw the outer end of the block outwardly toward the said lever and to hold the outer gear upon the block in engagement with the sector-gear.

19. In brake mechanism, the combination of a moving member, a brake therefor, a second moving member, and brake-actuating means controlled by the movement of the second moving member and including a member so mounted to move therewith as to present a gradually retreating operative surface as it is moved forward.

20. In brake mechanism, the combination of a moving member, a brake therefor, a pivotally mounted member, a sector-gear so mounted to move with said pivotally mounted member as to present a gradually retreating periphery as it is swung forwardly therewith, and suitable operative connections between the sector-gear and the brake.

21. In brake mechanism, the combination of a rotating member, a brake therefor, a pivotally mounted arm, and means, including as an element thereof a sector-gear mounted to move directly with the arm about an axis slightly eccentric to the axis of the arm, operatively connecting the said arm with the brake.

22. In brake mechanism, the combination of a brake, a trip for the brake, and means for actuating the trip which include a ratchet-worm, means for driving the ratchet-worm, a pawl slidably mounted upon the ratchet-worm and normally held out of engagement therewith, means for throwing the pawl into engagement with the ratchet-worm, means for disengaging the pawl from the ratchet-worm after it has been carried thereby a predetermined distance, and means for restoring the pawl to its original position with respect to the ratchet-worm.

23. In brake mechanism, the combination of two moving members, a brake for stopping one of said members, and means located beneath such member and rendered operative by the stopping of the other member for rendering said brake operative.

24. In brake mechanism, the combination of a rotating member, a traveling member, a brake for stopping said rotating member, means for holding the brake out of operation, and means located beneath the rotating member and rendered operative by the stopping of the traveling member for releasing said brake.

25. In brake mechanism, the combination of a rotating member, a traveling member, a brake for preventing rotation of said rotating member, means for holding the brake out of operation, and means rendered operative by the stopping of the traveling member for releasing the brake to stop the rotating member.

26. In brake mechanism, the combination of a rotating member, a traveling member, a motor, a brake for preventing rotation of said rotating member, means tending normally to move the brake into braking position, means for holding the brake out of braking position, and means actuated by the motor and rendered operative by the stopping of the traveling member for releasing said brake.

27. In brake mechanism, the combination of a traveling member, a motor, a brake for stopping said motor, means for holding the brake out of braking position, and brake-releasing mechanism comprising means moved by said traveling member and motor respectively and operative to release said brake upon the stopping of said traveling member.

28. In brake mechanism, the combination of a rotating member, a motor for rotating the same, a traveling member, an element moved thereby, a brake for stopping said motor, means for holding the brake out of braking position, and means operated by said motor and coacting with said element, said last-named means operating to release said brake upon the stopping of the traveling member.

29. In brake mechanism, the combination of a motor, a brake for stopping the same, a traveling member, an element moved thereby, means for holding said brake out of braking position, and means operated by said motor and coacting with said element, said last-named means reacting upon said element to release said brake upon the stopping of said traveling member.

30. In stop mechanism, the combination of a traveling member, a motor, means for stopping said motor, means for holding said last-named means out of operative position, and means for releasing said stopping means comprising coöperating elements moved by said traveling member and motor respectively and operating said stop-holding means upon the cessation of movement of said traveling member.

31. In stop mechanism, the combination of a traveling member, a motor, means for stopping said motor, means for holding said last-named means out of operative position, and means for releasing said stopping means comprising coöperating gear elements rotated by said traveling member and motor respectively and reacting upon the stopping of one of said gear elements to trip said stop-holding means.

32. In stop mechanism, the combination of a traveling member, a motor, a brake for stopping said motor, means for holding said brake out of braking position, and brake-releasing mechanism comprising coöperating elements moved by said traveling member and motor respectively, one of said elements being supplementarily moved upon the stopping of the traveling member to release said brake.

EDWARD T. CONDON, JR.

Witnesses:
WM. B. WHITNEY,
MAY FREVERT.